(12) United States Patent
Watkins et al.

(10) Patent No.: US 7,016,771 B2
(45) Date of Patent: Mar. 21, 2006

(54) METHOD AND SYSTEM FOR FLEXIBLE DISCONTINUOUS RECEIVE MANAGEMENT IN A TELEMATICS SYSTEM

(75) Inventors: Gary A. Watkins, Royal Oak, MI (US); Christopher L. Oesterling, Troy, MI (US); Jeffrey M. Stefan, Clawson, MI (US)

(73) Assignee: General Motors Corporation, Detroit, MI (US)

( * ) Notice: Subject to any disclaimer, the term of this patent is extended or adjusted under 35 U.S.C. 154(b) by 36 days.

(21) Appl. No.: 10/837,935

(22) Filed: May 3, 2004

(65) Prior Publication Data

US 2005/0246080 A1 Nov. 3, 2005

(51) Int. Cl.
*G06F 17/00* (2006.01)

(52) U.S. Cl. .................................. 701/1; 701/36; 701/2
(58) Field of Classification Search ...................... None
See application file for complete search history.

(56) References Cited

U.S. PATENT DOCUMENTS

| | | | | |
|---|---|---|---|---|
| 5,551,078 A | * | 8/1996 | Connell et al. | 455/343.3 |
| 6,028,537 A | * | 2/2000 | Suman et al. | 340/988 |
| 6,480,476 B1 | * | 11/2002 | Willars | 370/311 |
| 2003/0103599 A1 | | 6/2003 | Jijina et al. | 379/67.1 |
| 2003/0109268 A1 | | 6/2003 | Fraser et al. | 455/466 |
| 2003/0185162 A1 | | 10/2003 | Fraser et al. | 370/311 |
| 2003/0232619 A1 | | 12/2003 | Fraser | 455/420 |
| 2005/0174217 A1 | * | 8/2005 | Basir et al. | 340/425.5 |

OTHER PUBLICATIONS

U.S. Appl. No. 10/212,957 filed Aug. 6, 2002.

* cited by examiner

*Primary Examiner*—Michael J. Zanelli
(74) *Attorney, Agent, or Firm*—Anthony Luke Simon

(57) ABSTRACT

A method for flexible discontinuous receive management for telematics includes monitoring vehicle usage parameters and altering discontinuous receive behavior responsive to said monitored vehicle usage parameters. In an example, the method improves communication opportunity to vehicles that are inactive, to allow telematics operation in circumstances where the operation would have been delayed or even not possible.

9 Claims, 6 Drawing Sheets

| | DATE | TIME | IGN |
|---|---|---|---|
| | 5-13-04 | 7:30AM | 1 |
| | 5-13-04 | 8:45AM | 0 |
| | | | |
| | | | |
| | | | |
| | | | |
| | | | |

| day | time1 |
|---|---|
| | ave time |
| | time2 |

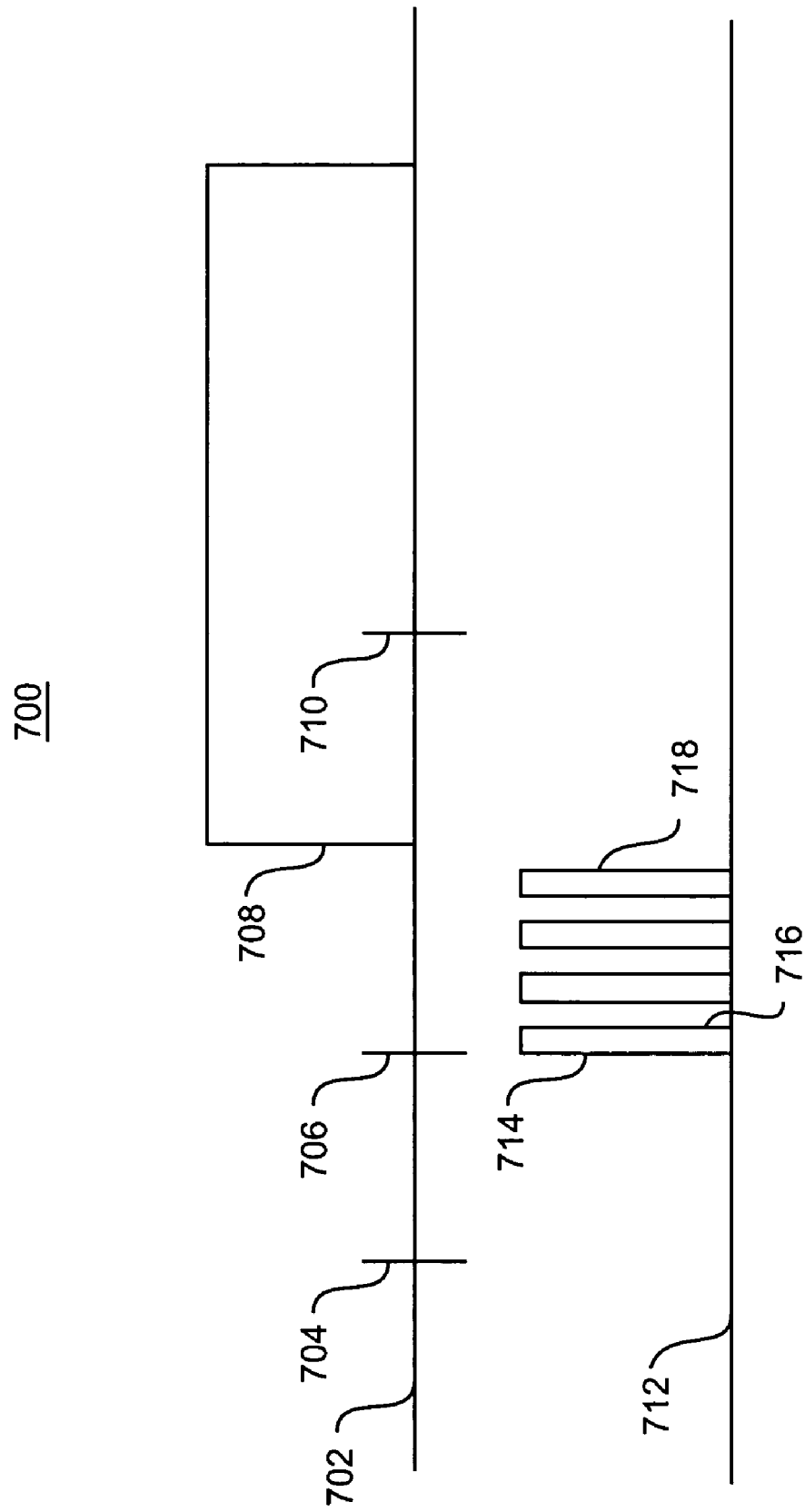

METHOD AND SYSTEM FOR FLEXIBLE DISCONTINUOUS RECEIVE MANAGEMENT IN A TELEMATICS SYSTEM

TECHNICAL FIELD

This invention relates to a method and system for managing discontinuous receive for telematics.

BACKGROUND OF THE INVENTION

Telematics systems are becoming increasingly available in motor vehicles, with services such as automatic door unlocking in high demand. In one known method, telematics units partially deactivate, or enter discontinuous receive (DRX) mode, shortly after a vehicle's ignition is turned off. DRX mode places most subsystems and components in a telematics unit temporarily in a deactivated state for a period of time in order to preserve battery life. After the period of deactivation expires, the telematics unit is temporarily reactivated to check for incoming messages or service requests. After the reactivation period, the telematics unit returns to the deactivated state.

In a known system, when a vehicle is inactive for an extended period of time, such as, for example a number of days or weeks, the telematics unit enters a second or extended discontinuous receive mode. In the extended discontinuous receive mode the period of deactivation is increased and the period of activation is decreased or entirely suspended, with the intent of further preserving vehicle battery life.

Extended discontinuous receive mode becomes an inconvenience when a telematics subscriber requires an immediate service, such as an automatic door unlock request. Thus, a telematics subscriber may be required to wait up to thirty minutes or more for an automatic door unlock request to be successfully serviced by the telematics unit.

SUMMARY OF THE INVENTION

Advantageously, this invention provides a method for flexible discontinuous receive management for telematics according to claim 1.

Advantageously, according to one example, this invention provides a method and system for flexible discontinuous receive management for telematics that monitors vehicle usage and alters a discontinuous receive behavior responsive to the monitored vehicle usage.

Advantageously, according to a preferred example, this invention provides a method for flexible discontinuous receive management for telematics that creates a data record containing the monitored vehicle usage, wherein the step of altering discontinuous receive behavior is responsive to the data record.

Advantageously, according to another preferred example, this invention provides a system for flexible discontinuous receive management for telematics, the system including means for monitoring vehicle usage and means for altering a discontinuous receive behavior responsive to the monitored vehicle usage.

DESCRIPTION OF THE DRAWINGS

FIG. 3 is an example timing diagram in accordance with an embodiment of the present invention;

FIG. 5 is an example data structure in accordance with an embodiment of the present invention;

FIG. 6 is another example data structure in accordance with an embodiment of the present invention;

FIG. 7 is another example timing diagram in accordance with in accordance with an embodiment of the present invention.

DESCRIPTION OF AN EXEMPLARY EMBODIMENT

Figure 1:
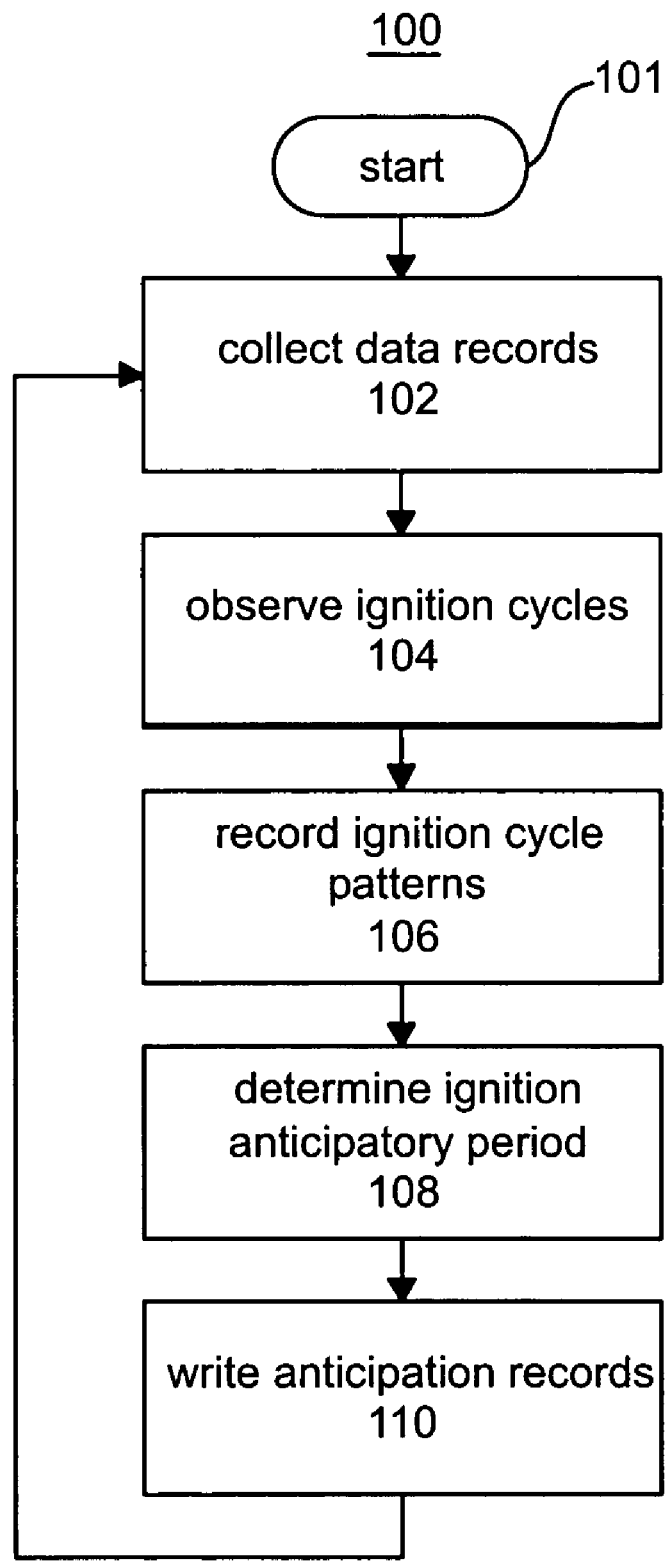
FIG. 1 illustrates example method steps for implementing this invention.

FIG. 1 illustrates example method steps for managing discontinuous receive for telematics units in accordance with the present invention at 100. The method steps begin at 101.

Figure 3:
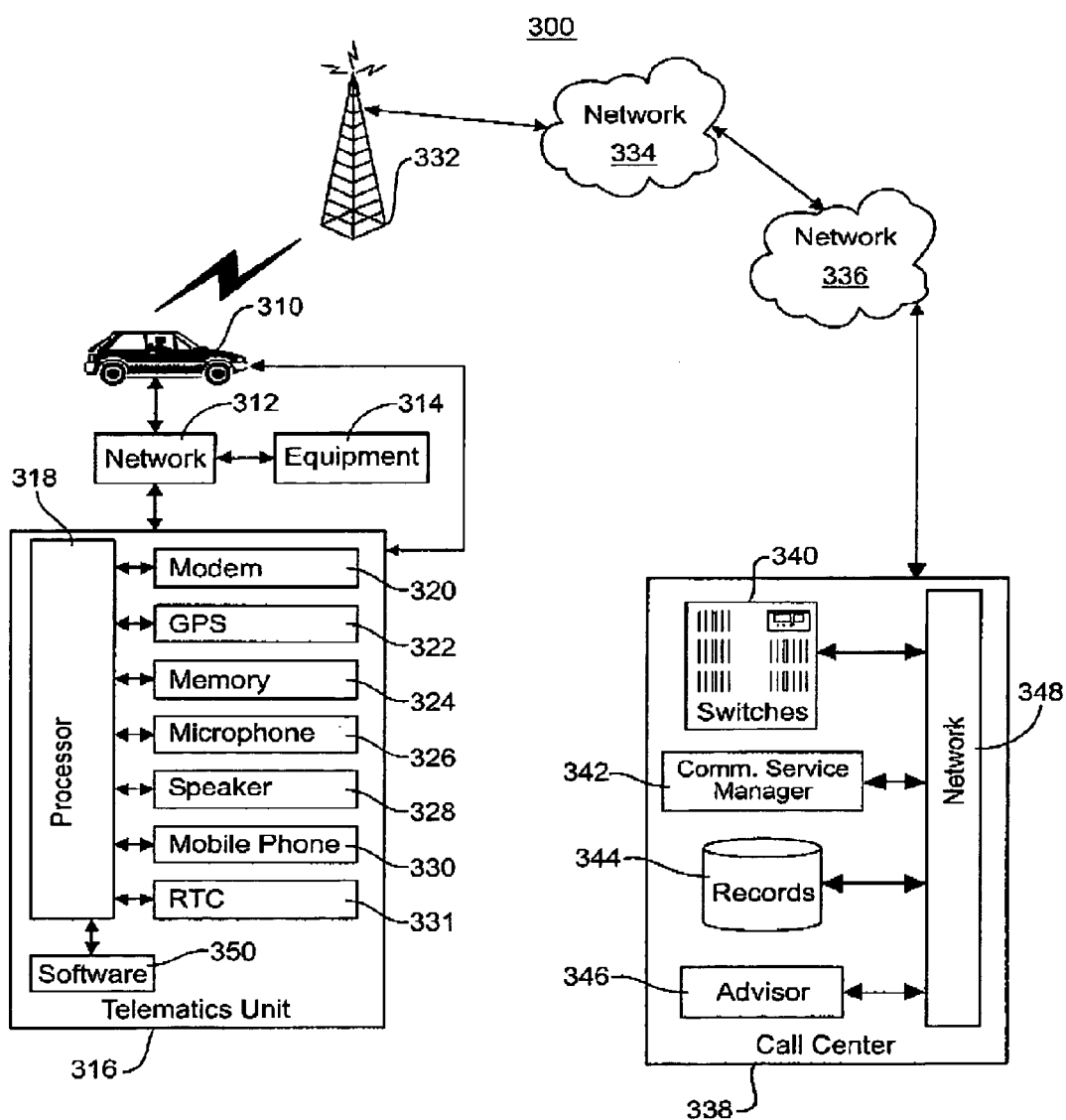
FIG. 3 illustrates an example system for implementing this invention.

A plurality of vehicle usage data records are collected in step 102. Data records may include one or more of the following: vehicle ignition patterns, subscriber behavior, and the time a subscriber will return to the vehicle set by a subscriber via a web page or direct interaction with a call center advisor (FIG. 3, 346). As an example of subscriber behavior, a data record may comprise the number of times a subscriber has requested services such as an automatic door unlock and may include the time and date of the requests.

As an example of subscriber web page or advisor interaction, a subscriber may park his or her car in an airport parking structure or lot for the duration of a vacation or business trip, knowing the time and date when they will return to the vehicle. The subscriber may update the return time on his or her personal web page provided by the telematics service provider (not shown), or may speak directly to an advisor to update their return time. This data is kept as a subscriber profile record in a database (FIG. 3, 344).

Data records, such as the number of ignition cycles to record over a period of time may contain a default value, such as, for example an ignition cycle observation period of thirty days, or may be adjusted to a lesser or greater period by a telematics subscriber via the profile record (FIG. 3, 344). A vehicle ignition cycle is comprised of the time the vehicle ignition is switched on until the time the vehicle ignition is switched off. Other records, such as, for example, door unlock service requests, may be added or deleted by the discretion of the subscriber.

Vehicle ignition cycles are observed in step 104 and recorded in step 106 over the period of time specified by the data records read in step 102. Ignition start and ignition end times and dates are recorded in the data record (FIG. 5, 500) for later analysis in step 108.

Step 108 represents the determination of ignition anticipatory periods. An ignition anticipatory period is comprised of a time window before an anticipated ignition on or start and a time window after an ignition off or stop. Ignition cycles are compared and relative time and date or day matches are searched for. As an example, if an ignition start is detected on every Wednesday approximately at 5:30PM, then this is recognized as a repeatable pattern of vehicle behavior and is recorded in an ignition anticipation data record structure (FIG. 6, 600).

Step 110 represents writing the determined anticipation data records to the ignition anticipation data record structure (FIG. 6, 600). In one embodiment, a field in the data records may contain the average time identifying an anticipated ignition start. The day associated with the time may be included in or is adjacent to the field containing the average time. Other adjacent fields in the data records may contain time-offset values providing a time before and a time after the average time identifying an anticipated ignition start. For example, the average time anticipating an ignition start may occur on Sundays at 8:30AM. The day and time, Sunday, 8:30AM, is stored in the anticipated ignition start field. A day and time value of Sunday, 8:15AM and Sunday 8:45AM may be stored in adjacent fields, thus defining an ignition anticipation window. The format of the mentioned data records may be left to the discretion of the designer, one skilled in the art. If anticipation records are received through a data call into the vehicle from a call center, these anticipation records are also stored at block 110.

Figure 2:
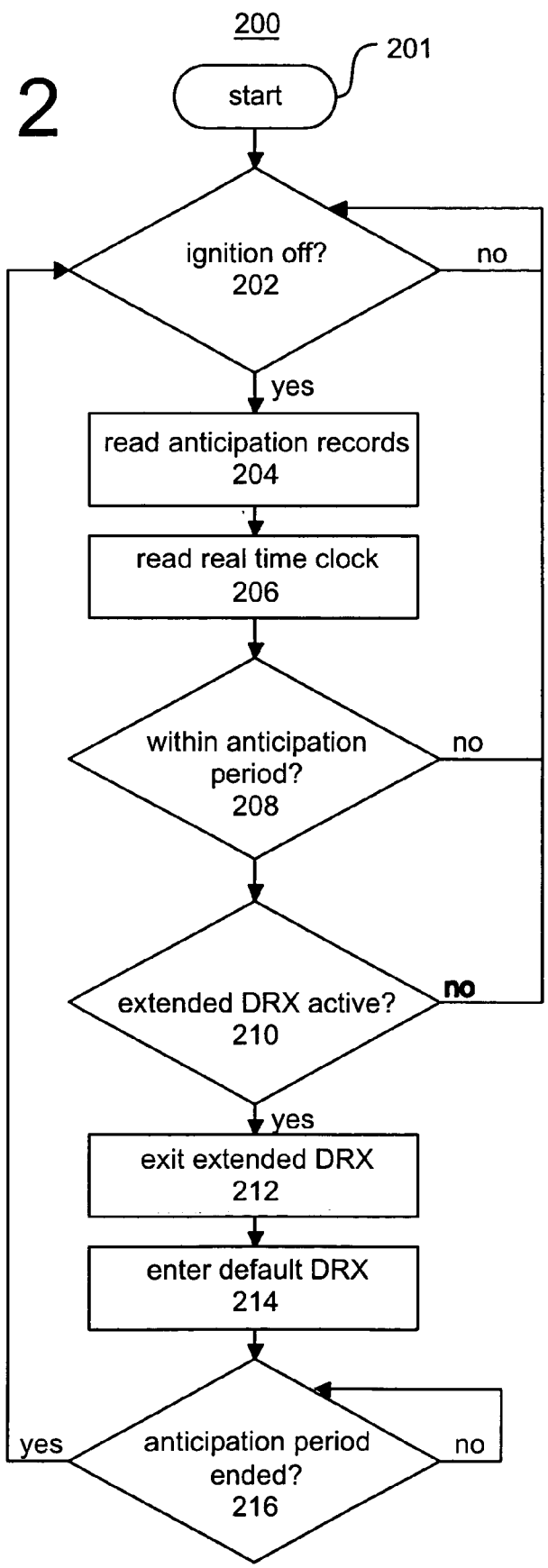
FIG. 2 illustrates further example method steps for implementing this invention.

Referring now to FIG. 2, the method steps 200 are execute in conjunction with the method steps defined in FIG. 1. The method steps begin at 201.

Step 202 determines whether the vehicle ignition is switched on or off. If the vehicle ignition is switched on, then the method remains at step 202, continually checking the ignition state. If the vehicle ignition is switched off, then the method steps advance to step 204.

Step 204 represents reading the recorded anticipation data records written in FIG. 1 step 110 from the ignition anticipation data record structure (FIG. 6, 600).

Step 206 represents reading a real-time clock resident in the telematics unit (FIG. 3, 331) and comparing the time and date with the time and date window values stored in the first ignition anticipation record (FIG. 6, 600). Step 208 determines whether the time and date read from the real-time clock fall within the anticipation period. If the time and date fall within the anticipation period, the method steps advance to step 210. If the method steps do not fall within the anticipation period, the method steps return to step 202.

Step 210 determines if the extended DRX is active. If the extended DRX cycle is not active the method steps return to step 202 and default (non-extended) DRX is applied. If the extended DRX cycle is active then the method steps advance to step 212.

Step 212 causes the telematics unit (FIG. 3, 316) to exit the extended DRX cycle. Step 214 returns the telematics unit to the default DRX cycle. Step 216 maintains the unit in the default DRX mode until the anticipation period is ended, then the system returns to step 202, forming a continuous monitoring loop.

FIG. 3 illustrates one embodiment of a system for managing discontinuous receive for telematics in accordance with the present invention at 300. Mobile vehicle communication system (MVCS) 300 includes a mobile vehicle communication unit (MVCU) 310 (also referred to herein as vehicle 310), a vehicle communication network 312, a telematics unit 316, one or more wireless carrier systems 332, one or more communication networks 334, one or more land networks 336, and one or more call centers 338. In one embodiment, vehicle 310 is implemented as a mobile vehicle with suitable hardware and software for transmitting and receiving voice and data communications. MVCS 100 may include additional components not relevant to the present discussion. Mobile vehicle communication systems are known in the art.

Vehicle 310, via a vehicle communication network 312, sends signals from the telematics unit 316 to various units of equipment and systems 314 within the vehicle 310 to perform various functions such as unlocking a door, setting personal comfort settings. In facilitating interaction among the various communications and electronic modules, vehicle communications network 312 utilizes network interfaces such as controller area network (CAN), ISO standard 11989 for high speed applications, ISO standard 11519 for lower speed applications, and Society of Automotive Engineers (SAE) standard J1850 for high speed and lower speed applications. Vehicle communication network 312 is also referred to as a vehicle bus.

Vehicle 310, via telematics unit 316, sends and receives radio transmissions from wireless carrier system 332. Wireless carrier system 332 is implemented as a cellular telephone system, or any other suitable system for transmitting signals between vehicle 310 and communications network 334.

Telematics unit 316 includes a processor 318 coupled to a wireless modem 320, a global positioning system (GPS) unit 322, an in-vheicle memory 324, a microphone 326, one or more speakers 328, and an embedded or in-vehicle mobile phone 330. In other embodiments, telematics unit 316 may be implemented without one or more of the above listed components, such as, for example speakers 328. It is understood that the speaker 328 may be implemented as part of the vehicle audio system, which accepts audio and other signals from telematics unit 316 as is known in the art. Telematics unit 316 may include additional components and functionality as determined by the system designer and know in the art for use in telematics units.

In one embodiment, processor 318 is implemented as a microcontroller, controller, microprocessor, host processor, or vehicle communications processor. In another embodiment, processor 318 is implemented as an application specific integrated circuit (ASIC). In yet another embodiment, processor 318 is implemented as a processor working in conjunction with a central processing unit (CPU) performing the function of a general-purpose processor. GPS unit 322 provides latitude and longitude coordinates of the vehicle responsive to a GPS broadcast signal received from one or more GPS satellites (not shown). In-vehicle mobile phone 330 is a cellular type phone, such as, for example an analog, digital, dual-mode, dual-band, multimode or multi-band cellular phone.

Associated with processor 318 is a real time clock (RTC) 331 providing accurate date and time information to the telematics unit hardware and software components that may require date and time information.

In one embodiment date and time information may be requested from the RTC 331 by other telematics unit components. In other embodiments the RTC 331 may provide date and time information periodically, such as, for example, every ten milliseconds.

Processor 318 executes various computer programs that interact with operational modes of electronic and mechanical systems within the vehicle 310. Processor 318 controls communication (e.g. call signals) between telematics unit 316, wireless carrier system 332, and call center 338. In one embodiment, a voice recognition application is installed in the processor 318 that can translate human voice input through microphone 326 to digital signals. Processor 318 generates and accepts digital signals transmitted between telematics unit 316 and a vehicle communication network 312 that is connected to various electronic modules in the vehicle. In one embodiment, these digital signals activate the programming mode and operation modes, as well as provide for data transfers. In this embodiment, certain signals from processor 318 are translated into voice messages and sent out through speaker 328.

Associated with processor 318 is software 350 that observes and records vehicle behavior, such as, for example, vehicle ignition cycles as described above with respect to FIG. 1.

Communications network 334 includes services from one or more mobile telephone switching offices and wireless networks. Communication network 334 connects wireless carrier system 332 to land network 336. Communication network 334 is implemented as any suitable system or collection of systems for connecting wireless carrier system 332 to vehicle 310 and land network 336.

Land network 336 connects to communication network 334 to call center 338. In one embodiment, land network 336 is a public switched telephone network (PSTN). In another embodiment, land network 336 is implemented as an Internet protocol (IP) network. In other embodiments, land network 336 is implemented as a wired network, an optical network, a fiber network, other wireless networks, or any combination thereof. Land network 336 is connected to one or more landline telephones. Communication network 334 and land network 336 connect wireless carrier system 332 to call center 338.

Call center 338 contains one or more voice and data switches 340, one or more communication service managers 342, one or more communication services databases containing subscriber profile records 344, one or more communication services advisors 346, and one or more network systems 348. In an example, the call center is a voice call center, providing verbal communications between and advisor 348 in the call center and a subscriber in a mobile vehicle. Subscriber profile records 344 comprise subscriber or advisor 346 entered data, such as, for example, the time and date a subscriber may return to his or her vehicle after a vacation, or the number of times a subscriber has requested an automatic door unlock. Subscriber profile records may consist of preferences and settings (a) set by the subscriber through a we interface (not shown), (b) set by an advisor through a work station not shown, (c) or set by a control program running at the call center based upon predetermined criteria, such as monitored subscriber call-in behavior.

Switch 340 of call center 338 connects to land network 336. Switch 340 transmits voice or data transmissions from call center 336, and receives voice or data transmissions from telematics unit 338 in vehicle 310 through wireless carrier system 332, communications network 334, and land network 336. Switch 340 receives data transmissions from or sends data transmissions to one or more communication services managers 342 via one or more network systems 348. The subscriber's preferences or settings are transmitted to the vehicle during a data call and stored within memory in the vehicle telematics unit 316 for use as anticipation records. The data calls are scheduled in response to an update of a subscriber profile record.

Figure 4:
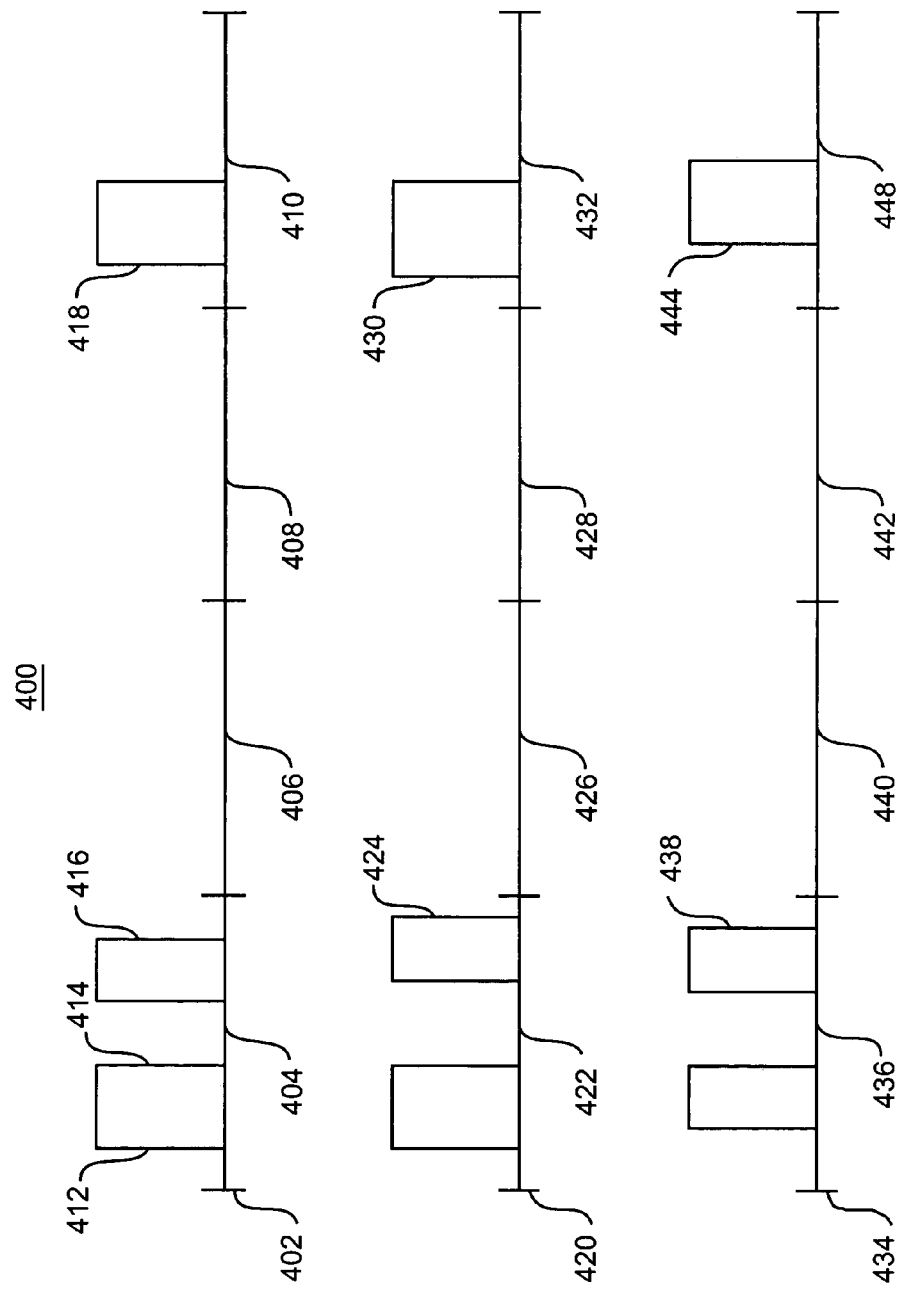
FIG. 4 is an example linear representation of a set of ignition cycles in accordance with an embodiment of the present invention.

FIG. 4 is a linear representation of a set of ignition cycles observed over a period of three weeks, as an example embodiment of the present invention.

Reference 402 is a timeline demarcation representing the beginning of a day in the first week of an observation period. An example observation period may begin at 12:01AM on a Monday morning and ends on a Sunday night at 12:00AM. This observation period may be maintained for N weeks where N may contain a value of, for example, three, indicating a three-week period. Alternatively, the observation period may be a rolling buffer of the last N weeks of usage.

References 404, 406, 408 and 410 represent Thursday, Friday, Saturday, and Sunday, respectively, of the first week.

Reference 412 represents a first ignition on state during Thursday of the first week, and reference 414 represents a first ignition off state during Thursday of the first week. The duration between references 412 and 414 represents a complete ignition cycle. The first ignition on time and date 412 and the first ignition off time and date are recorded in a data structure shown in FIG. 5, 500.

Reference 416 represents a second ignition off during Thursday of the first week, such as, for example, the ignition switched off at 9:30PM. Reference 418 represents a first ignition on during Sunday of the first week, such as, for example, 8:30AM. The times and dates associated with the ignition cycles are record in the data structure shown in FIG. 5, 500.

Reference 420 is a timeline demarcation representing the beginning of a day in the second week, with references 422, 426, 428 and 432 representing Thursday, Friday, Saturday, and Sunday, respectively, of the second week.

Reference 424 represents a second ignition off on Thursday of the second week, such as, for example, the ignition switched off at 9:15PM. Reference 430 represents a first ignition on during Sunday of the second week, such as, for example, 8:20AM.

Reference 434 is a timeline demarcation representing the beginning of a day in the third week, with references 436, 440, 442 and 448, representing Thursday, Friday, Saturday, and Sunday, respectively, of the third week.

Reference 438 represents a third ignition off on Thursday of the third week, such as, for example, the ignition switched off at 9:20PM. Reference 444 represents a first ignition on during Sunday of the third week, such as, for example, 8:35AM.

During this data observation collection period, the software (FIG. 3, 350) observes and analyzes the ignition cycle patterns, and identifies similar times and dates when ignition cycles occur. For example, the software monitor (FIG. 3, 350) may detect a recurring ignition cycle off transition on Thursdays at approximately 9:30PM and a recurring ignition on cycle on Sundays at approximately 8:30AM.

FIG. 5 is an example data record structure in accordance with the present invention at 500. In one embodiment, the data record structure 500 is comprised of an array of records 508, 510, through 512 containing three fields. The fields are comprised of a date field 502, a time field 504, and an ignition field 506.

The ignition field 506 associated with records 508, 510, and 512 is a representation of the vehicle ignition state associated with the time and date fields in the respective records. In one embodiment, a "1" represents the ignition switched on, and a "0" represents the ignition turned off.

The software (FIG. 3, 530) accessed the data structure 500 and its associated records and examines the data fields for similar ignition on and ignition off days and/or times or for other patterns. For example, if the ignition on times fall within a predetermined time interval or window, such as an interval of thirty minutes, then in one embodiment the average of the ignition on intervals is calculated. This average comprises an ignition on anticipatory period as shown in FIG. 1, step 108. A computer readable representation of the calculated time average and observed day are placed in an ignition anticipation record within a data structure (FIG. 6, 600) as illustrated in FIG. 1, step 110.

FIG. 6 is an example ignition anticipation data record structure in accordance with the present invention at 600. In one embodiment, the ignition anticipation data record structure is comprised of a day field 602, a time1 field 604, an average time field 606, and a time2 field 608. The average time field 606 data is comprised of the average of observed ignition on times.

The time1 field 604 is a time value comprised of N minutes before the average anticipated ignition start time 606. In one embodiment, factors determining the value of N are comprised of remaining battery power, a return time specified by a subscriber via access to a subscriber profile database, or the recorded frequency of a subscriber requesting a service, such as, for example, a door unlock request. In other embodiments, the value of N is left to the discretion of the system designer.

In an embodiment, the ignition anticipation data record structure may contain many records. In one embodiment, additional day fields 610, time1 612, average time 614, and time2 616 fields may comprise an array of data structures, accessible by the software (FIG. 3, 350).

FIG. 7 is an example timing diagram in accordance with the present invention at 700. References 702 and 712 are timelines on which days of the week are inscribed. For example, demarcation 704 may represent 12:00AM on Sunday of an arbitrary week.

Reference 706 represents a time demarcation within a day. For example, demarcation 706 may represent 8:15AM on Sunday of an arbitrary week. Reference 708 represents an ignition state transition from off to on. Reference 710 represents another time demarcation within a day, for example 8:45AM on Sunday of an arbitrary week. The time interval between references 706 and 710 comprise an ignition anticipation period.

Reference 714 represents a transition from an extended DRX cycle (FIG. 2, 212) to a default DRX cycle (FIG. 2, 214) in response to the telematics unit 316 detecting an ignition anticipation period (FIG. 2, steps 202–216), with the transition causing the telematics unit subsystems to energize and test for any incoming or pending commands, such as, for example, a door unlock request. If a door unlock request is pending or commanded, then the request is executed.

Reference 716 represents a transition within the telematics unit from a energized state to a de-energized state. The period between the transitions 714 and 716 comprise the period when the telematics unit subsystems are energized and able to accept and execute commands. In one embodiment, the period may be symmetrical. In other embodiments, the period may be asymmetrical. In another embodiment, the duration of the energized period between references 714 and 716 may be lengthened to. increase the likelihood of a command being received and executed by the telematics unit.

Reference 718 represents the last state transition of the default DRX cycle before the ignition is switched on at 708. In one embodiment, when the ignition is switched on, the telematics unit is fully energized and any DRX cycle, extended or default, is cancelled.

What is claimed is:

1. A method for flexible discontinuous receive management in a telematics system comprising the steps of:
   monitoring vehicle usage;
   altering a discontinuous receive behavior responsive to said monitored vehicle usage.

2. The method of claim 1 also comprising the step of creating a plurality of data records of the monitored vehicle usage, wherein the step of altering is responsive to the data record.

3. The method of claim 1 wherein the step of altering comprises changing a discontinuous receive state from a first state to a second state responsive to monitored vehicle usage.

4. The method of claim 2 wherein the step of creating a data record of the monitored vehicle usage is comprised of:
   recording vehicle ignition cycle patterns;
   observing telematics subscriber behavior; and
   examining telematics subscriber profile information.

5. The method of claim 2 also comprising the step of creating a plurality of ignition anticipation data records.

6. The method of claim 5 wherein the ignition anticipation data records represent a pattern of vehicle ignition cycles.

7. The method of claim 4 wherein the observed telematics subscriber behavior comprises a history of subscriber calls requesting door unlocks.

8. The method of claim 4 wherein examined subscriber profile information comprises subscriber vehicle usage preferences.

9. A system for flexible discontinuous receive management in a telematics system comprising:
   means for monitoring vehicle usage;
   means for altering a discontinuous receive behavior responsive to said monitored vehicle usage.

* * * * *